United States Patent [19]
Piock et al.

[11] Patent Number: 6,158,410
[45] Date of Patent: Dec. 12, 2000

[54] INTERNAL COMBUSTION ENGINE WITH AT LEAST ONE INJECTION DEVICE PER CYLINDER

[75] Inventors: Walter Piock; Martin Wirth, both of Hitzendorf, Austria

[73] Assignee: AVL List GmbH, Graz, Austria

[21] Appl. No.: 09/228,648

[22] Filed: Jan. 12, 1999

[30] Foreign Application Priority Data

Jan. 13, 1998 [AT] Austria .................................. GM 9/98

[51] Int. Cl.[7] .............................. F02B 23/10; F02B 31/00
[52] U.S. Cl. ........................... 123/301; 123/302; 123/305
[58] Field of Search .................... 123/276, 301, 123/302, 305

[56] References Cited

U.S. PATENT DOCUMENTS

| | | | |
|---|---|---|---|
| Re. 24,851 | 8/1960 | Buchi | 123/301 X |
| 3,572,298 | 3/1971 | Onishi et al. | 123/301 |
| 4,920,937 | 5/1990 | Sasaki et al. | 123/305 |
| 5,115,774 | 5/1992 | Nomura et al. | 123/276 |

FOREIGN PATENT DOCUMENTS

| | | | |
|---|---|---|---|
| 001392 | 4/1997 | Austria . | |
| 001563 | 7/1997 | Austria . | |
| 409918 | 2/1925 | Germany | 123/301 |
| 9-317475 | 12/1997 | Japan . | |
| 625948 | 7/1949 | United Kingdom | 123/301 |

*Primary Examiner*—Tony M. Argenbright
*Attorney, Agent, or Firm*—Dykema Gossett PLLC

[57] ABSTRACT

In an internal combustion engine with at least one injection device per cylinder for direct fuel injection into a combustion chamber, the injector nozzle is located in a top surface of the combustion chamber, which is formed in the cylinder head. In order to reduce the build-up of deposits and carbon residues in the region where the injection device enters the combustion chamber, the area around the injector nozzle is configured as a flow-directing surface for a swirl and/or tumble flow.

24 Claims, 4 Drawing Sheets

INTERNAL COMBUSTION ENGINE WITH AT LEAST ONE INJECTION DEVICE PER CYLINDER

BACKGROUND OF THE INVENTION

This invention relates to an internal combustion engine with at least one injection device per cylinder for direct fuel injection into a combustion chamber, the nozzle of the injection device being positioned in a combustion chamber top face formed in the cylinder head.

DESCRIPTION OF THE PRIOR ART

In direct-injection internal combustion engines, in particular of the spark-ignition type, the formation of deposits and carbon residues in the area of the injector nozzle may significantly change the characteristic of the injection jet. This may be prevented by keeping the temperature at the injector orifice below carbonization temperature by thermally coupling the injection device to the cylinder head. In such instance the front part of the injection device is mechanically coupled to the cylinder head in order to obtain proper heat transfer from the injector into the cylinder head. The disadvantage of this procedure is that the cylinder head will be subject to additional tensions.

Another possibility of preventing the build-up of carbon particles around the injector nozzle is provided by raising the temperature in the entrance area of the injection device above self-cleaning temperature in order to burn any residues. Because of the wide thermal operating range of an internal combustion engine for motor vehicles, and as fuel metering is often effected in the front part of the injection device, this measure cannot be employed with all injection systems.

The build-up of carbon residues may further be reduced by locating the injector nozzle in a squish area, in order to increase flow velocities around the nozzle. The effect of this measure is limited to a narrow range directly before top dead center of the piston, however. After top dead center the flame and unburned fuel are sucked back into the nozzle area of the injection device. As a consequence, a temperature rise and increased build-up of deposits will take place around the injector nozzle. Combustion will be impaired and fuel consumption and CH emissions will rise.

SUMMARY OF THE INVENTION

It is an object of this invention to avoid the above disadvantage and to reduce the build-up of deposits and carbon residues in the area where the injection device enters the combustion chamber.

According to the invention this object is achieved by configuring the area around the nozzle of the injection device as a flow-directing surface for a swirl and/or tumble flow. By designing the area around the injector nozzle as a flow-directing surface, the primary flow in the cylinder is directed such that the last portion of fuel leaving the injection device is quickly carried from the injector to the ignition site, the flow-directing surfaces assisting the swirl or tumble movement. Due to the high flow velocities in the nozzle region the fuel is rapidly advanced from the nozzle towards the ignition site, such that fewer deposits will be able to form. In addition, charge stratification is improved in the combustion chamber, especially towards the end of the injection period.

The invention preferably provides that the flow-directing surface is formed by the top surface of the combustion chamber and/or the top surface of a piston. In this way the flow of charge may be specifically directed towards the ignition site, for example, in the center of the combustion chamber. In addition, the primary flow will produce a cooling effect.

It is provided in a preferred variant that the flow-directing surface be formed, at least partially, by a recess. It could equally be provided that the flow-directing surface be formed, at least partially, by a guide rib. The flow-directing surfaces formed in this way are easy to manufacture and will have no adverse effects on the inhomogeneous combustion process.

The flow velocities are sufficiently increased by providing that the maximum extension of the flow-directing surface—in a sectional view normal to the cylinder axis—should equal about one quarter to one half of the cylinder diameter, and preferably about one third of the cylinder diameter. Advantageously, the largest distance of the flow-directing surface from the cylinder head plane will be in the region where the flow-directing surface and the top surface of the combustion chamber intersect, and should at least correspond to the distance between the remotest point of the nozzle from the piston, and the cylinder head plane.

Another measure aimed at reducing the build-up of carbon deposits is constituted by giving the flow-directing surface a concave shape, its largest curvature being in a flow exit area and/or in the area around the injector nozzle.

In a sectional view normal to the cylinder axis, the flow-directing surface may be asymmetrical or symmetrical in shape. The asymmetrical shape is specifically suited for promoting a swirl movement. With tumble movements a symmetrical shape of the flow-directing surface is preferred.

The invention is particularly well suited for use with combustion chamber top surfaces of a roof-shaped design. Basically, however, it may also be employed with any other design of combustion chamber and any number of charge exchange valves.

BRIEF DESCRIPTION OF THE DRAWINGS

The invention will now be further described with reference to the accompanying drawings, in which.

DESCRIPTION OF PREFERRED EMBODIMENTS

Figure 1:
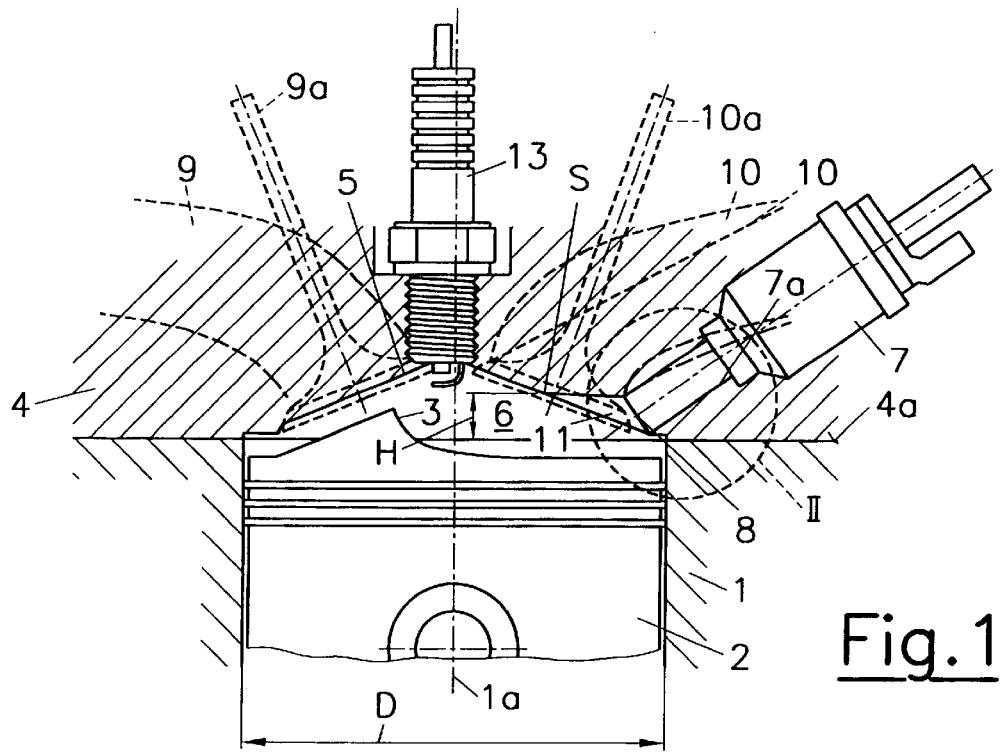
FIG. 1 is a cross-sectional view of a cylinder of an internal combustion engine in accordance with the invention, as exemplified in one variant.

FIG. 1 shows a cylinder 1 of an internal combustion engine, in which is positioned a reciprocating piston 2. The top surface 3 of the piston 2 and the roof-shaped combustion chamber top face 5 formed by the cylinder head 4 confine a combustion chamber 6 entered by an injection device 7, whose nozzle 8 is positioned near the periphery of the combustion chamber top face 5. Charge exchange ports 9 and 10 for supplying fresh air and expelling exhaust gas also open into the combustion chamber 6. The corresponding valves for the intake and exhaust streams bear reference numerals 9*a* and 10*a*.

Figure 2:
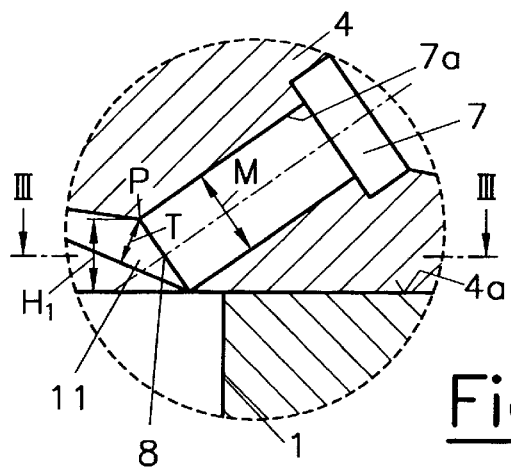
FIG. 2 shows detail II in FIG. 1.
Figure 3:
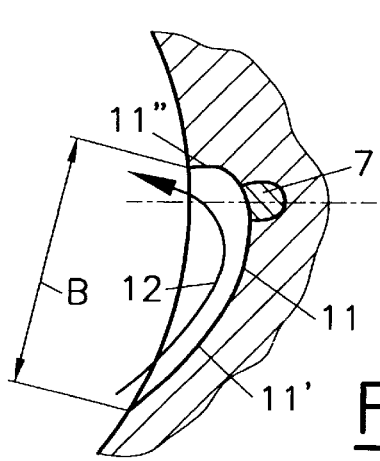
FIG. 3 is a section through the entrance area of the injection device along line III—III in FIG. 2.
Figure 3A:
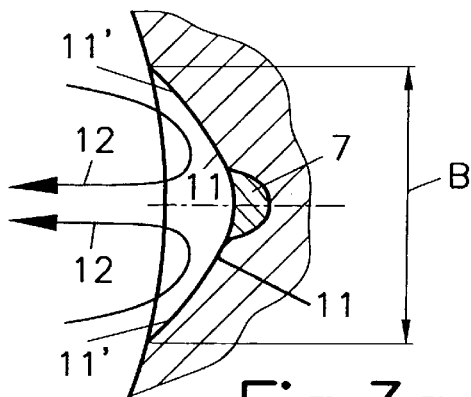
FIG. 3a is a section in analogy to FIG. 3, with a symmetrically shaped flow-directing surface.
Figure 4:
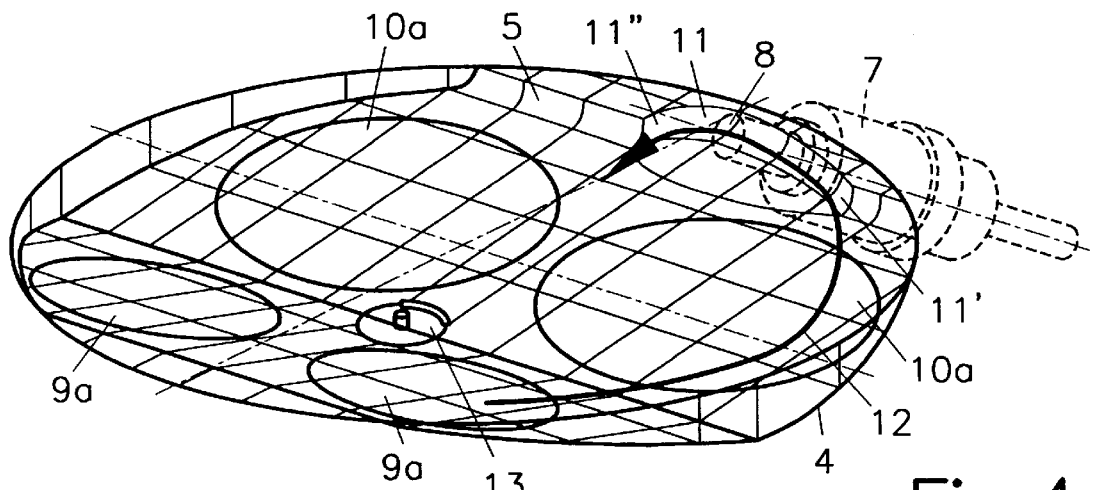
FIG. 4 is an oblique view of the combustion chamber top surface of a cylinder head with four valves per cylinder.
Figure 5:
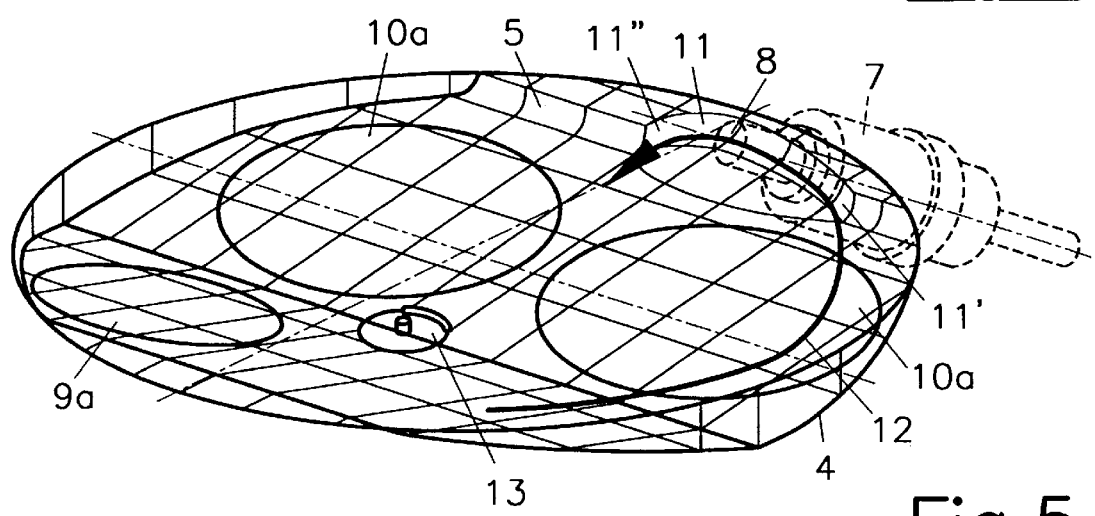
FIG. 5 is an oblique view of the combustion chamber top surface of a cylinder head with three valves per cylinder.
Figure 6:
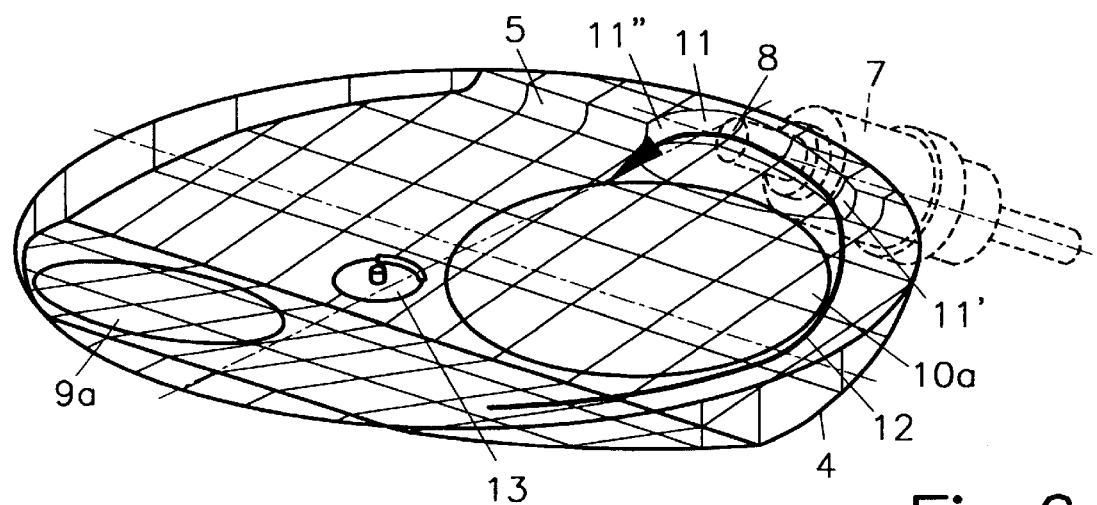
FIG. 6 is an oblique view of the combustion chamber top surface of a cylinder head with two valves per cylinder.

In the region of the nozzle 8 of the injection device 7 flow-directing surfaces 11 are provided for assisting a swirl flow indicated by arrows 12, as is shown in FIGS. 2 to 4. The term swirl flow denotes a motion about the cylinder axis 1*a*. The flow-directing surfaces 11 are configured, at least partially, as recesses in the combustion chamber top face 5. The flow-directing surfaces 11 presented in FIGS. 3 to 6 are shaped asymmetrically to promote the swirl movement, and are substantially directed towards the ignition source 13 in the vicinity of the cylinder axis 1*a*. To promote a tumble flow the flow-directing surface 11 should have a symmetric shape, as is shown in FIG. 3*a*. The term tumble flow refers to a rotary motion about an axis normal to the cylinder axis 1*a*. As is seen in FIGS. 4, 5, and 6, the flow-directing surface 11 may be employed with any number of charge exchange ports 9 and 10.

Figure 7:
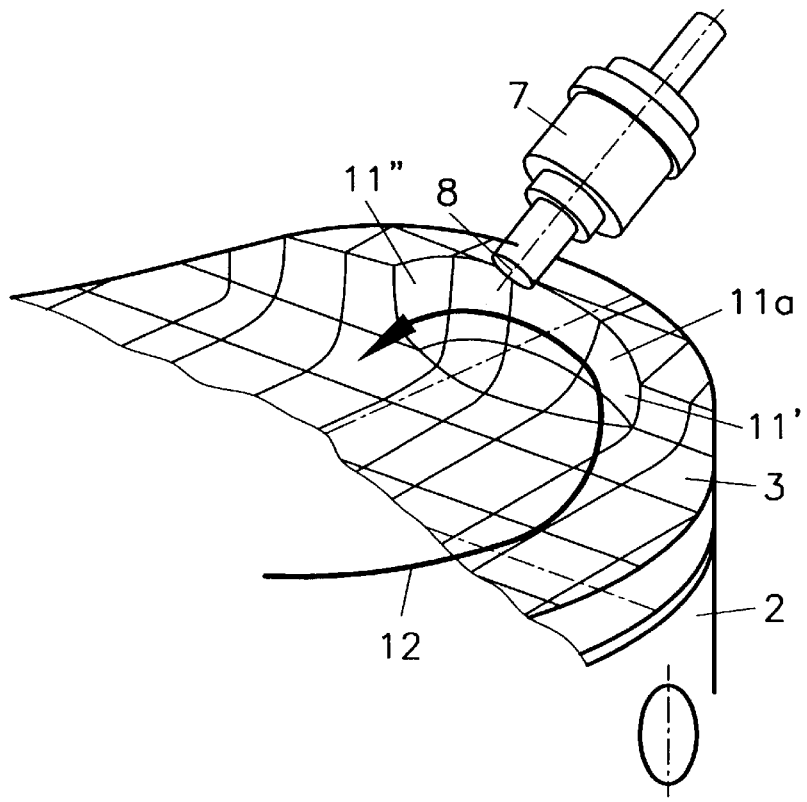
FIG. 7 is an oblique view of the top surface of a piston according to another variant of the invention.

FIG. 7 shows another variant of the invention, in which the flow-directing surfaces 11*a* are formed by recesses in the top surface 3 of the piston 2. In analogy to the variant of FIG. 4, the flow-directing surfaces 11*a* are directed towards the ignition source 13.

In FIGS. 1 to 7 the flow-directing surfaces 11 are designed so as to assist swirl movements. The flow-directing surfaces 11 form a concave recess between an entry area 11' and an exit area 11", the curvature reaching its maximum preferably in the region of the nozzle 8 or in the exit area 11". In a cross-section parallel to the cylinder head plane 4*a* through the area of the nozzle 8, the flow-directing surface 11 may assume a continuously curved parabolic shape, as is shown in FIG. 3. The maximum extension B of the flow-directing surface 11, 11*a* equals about one quarter to one half, and preferably about one third of the cylinder diameter D, as viewed in the direction of the cylinder axis 1*a*. The point S of the flow-directing surface 11, 11*a* which is remotest from the cylinder head plane 4*a*, is situated in the area of intersection between the surface 11, 11*a* and the combustion chamber top face 5. The corresponding distance is referred to as H and amounts at least to the maximum distance $H_1$ in area P of the nozzle 8 of the injection device 7 from the cylinder head plane 4*a*.

The maximum distance T from the surrounding combustion chamber top face 5 is 0.1 to 1, and preferably about 0.5 times the diameter M of the injection bore 7*a*.

Figure 8:
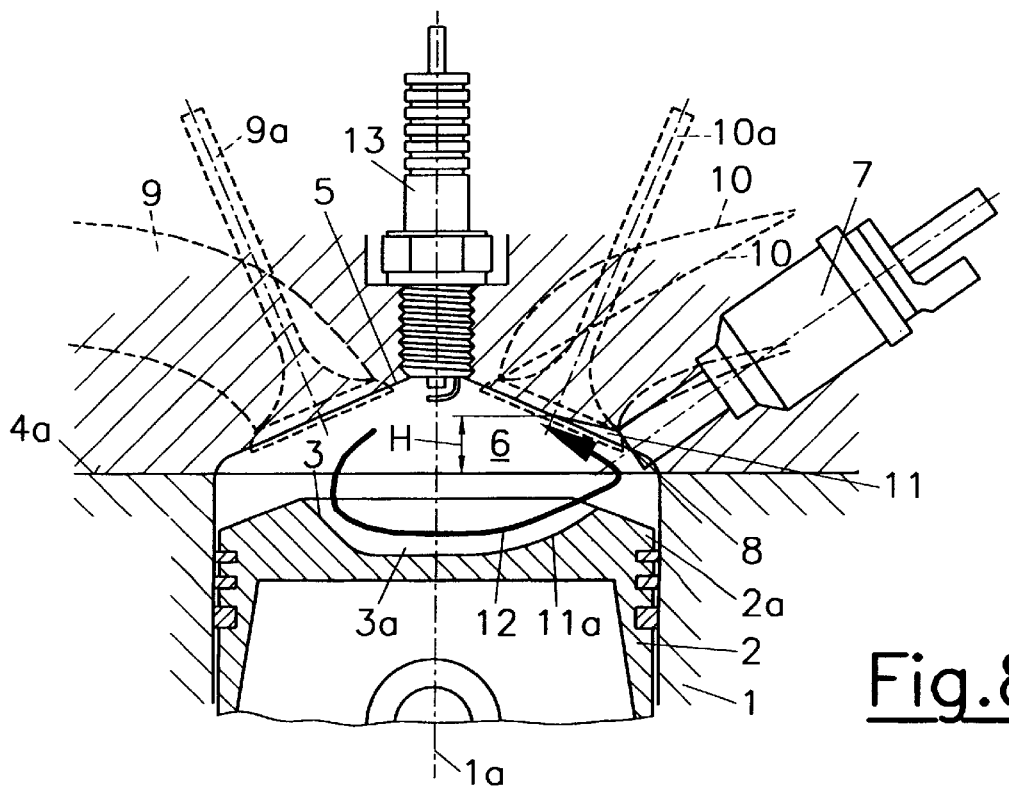
FIG. 8 shows the cylinder of an internal combustion engine as described by the invention, in yet another variant.
Figure 9:
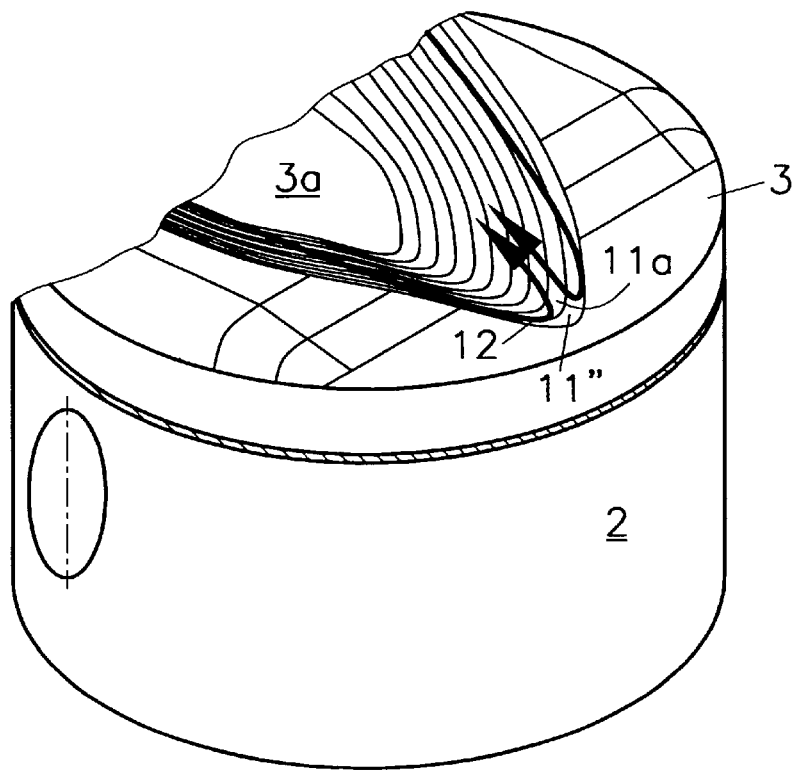
FIG. 9 is an oblique view of a piston of the engine presented in FIG. 8.
Figure 10:
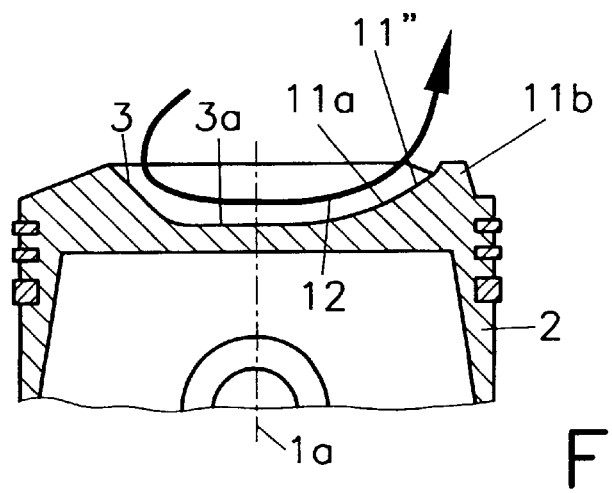
FIG. 10 is a cross-sectional view of a piston, in a modified version of the piston in FIG. 9.

FIGS. 8 to 10 present variants with flow-directing surfaces 11, 11*a* assisting tumble movements. In the variant shown in FIG. 8 the combustion chamber top face 5 features flow-directing surfaces 11 formed by recesses, which promote an upright motion of the tumble flow 12, guiding it in the direction of the ignition source 13. The flow-directing surface 11 may be arranged symmetrically to a transversal plane through the engine, as is shown in FIG. 3*a*. In the variant shown in FIG. 8 additional flow-directing surfaces 11*a* are provided in the top surface 3 of the piston 2. These additional surfaces are provided by suitably designing the piston recess 3*a*, which extends towards the piston rim 2*a* next to the injection site by forming the flow-directing surface 11*a*, as is shown in FIG. 9.

In addition thereto, or instead thereof, a guide rib 11*b* may be provided on the piston 2, in the exit area 11" of the flow-directing surface 11*a*, to support the flow movement 12, as is shown in FIG. 10.

By adopting concrete flow-guiding measures with the use of directing surfaces 11, 11*a* in the region of the nozzle 8 of the injection device 7, fuel remains are blown off the nozzle 8 and advanced towards the ignition source 13, especially at the end of the injection process. As a consequence, deposits and carbon residues are effectively prevented from building up in the area of the nozzle 8. The flow-directing surfaces 11, 11*a* will also improve charge stratification, in particular towards the end of the injection period. Most preferably, the flow-directing surfaces 11, 11*a* are provided both in the combustion chamber top face 5 and top surface 3 of the piston 2.

We claim:

1. An internal combustion engine with at least one injection device per cylinder for direct fuel injection into a combustion chamber, a nozzle of the injection device being positioned in a combustion chamber top face formed in a cylinder head, wherein an area around the nozzle of the injection device is configured as a flow-directing surface for a swirl or tumble flow, and wherein the flow-directing surface is formed, at least partially, by a recess.

2. An internal combustion engine according to claim 1, wherein the flow-directing surface is formed by the combustion chamber top face and a top surface of a piston.

3. An internal combustion engine according to claim 1, wherein the flow-directing surface is formed by the combustion chamber top face or a top surface of a piston.

4. An internal combustion engine according to claim 1, wherein a maximum extension of the flow-directing surface—in a sectional view normal to a cylinder axis—equals about one quarter to one half of a cylinder diameter.

5. An internal combustion engine according to claim 4, wherein the maximum extension equals one third of the cylinder diameter.

6. An internal combustion engine according to claim 1, wherein a largest distance of the flow-directing surface from a cylinder head plane is in the region where the flow-directing surface and the combustion chamber top face intersect, and corresponds at least to a distance between a remotest point of the nozzle from the piston, and the cylinder head plane.

7. An internal combustion engine according to claim 1, wherein a maximum distance between the flow-directing surface and the surrounding combustion chamber top face is about 0.1 to 1 times a diameter of an injection bore.

8. An internal combustion engine according to claim 7, wherein the maxiumum distance is about 0.5 times the diameter of the injection bore.

9. An internal combustion engine according to claim 1, wherein the flow-directing surface has a concave shape, its largest curvature being in an exit area of the flow and in the area of the nozzle of the injection device.

10. An internal combustion engine according to claim 1, wherein the flow-directing surface has a concave shape, its largest curvature being in an exit area of the flow or in the area of the nozzle of the injection device.

11. An internal combustion engine according to claim 1, wherein the flow-directing surface has an asymmetrical shape in a sectional view normal to a cylinder axis.

12. An internal combustion engine according to claim 1, wherein the flow-directing surface has a symmetrical shape in a sectional view normal to the cylinder axis.

13. An internal combustion engine with at least one injection device per cylinder for direct fuel injection into a combustion chamber, a nozzle of the injection device being positioned in a combustion chamber top face formed in a cylinder head, wherein an area around the nozzle of the injection device is configured as a flow-directing surface for a swirl or tumble flow, and wherein the flow-directing surface is formed, at least partially, by a guide rib.

14. An internal combustion engine according to claim 13, wherein the flow-directing surface is formed by the combustion chamber top face and a top surface of a piston.

15. An internal combustion engine according to claim 13, wherein the flow-directing surface is formed by the combustion chamber top face or a top surface of a piston.

16. An internal combustion engine according to claim 13, wherein a maximum extension of the flow-directing surface—in a sectional view normal to a cylinder axis—equals about one quarter to one half of a cylinder diameter.

17. An internal combustion engine according to claim 16, wherein the maximum extension equals one third of the cylinder diameter.

18. An internal combustion engine according to claim 13, wherein a largest distance of the flow-directing surface from a cylinder head plane is in the region where the flow-directing surface and the combustion chamber top face intersect, and corresponds at least to a distance between a remotest point of the nozzle from the piston, and the cylinder head plane.

19. An internal combustion engine according to claim 13, wherein a maximum distance between the flow-directing surface and the surrounding combustion chamber top face is about 0.1 to 1 times a diameter of an injection bore.

20. An internal combustion engine according to claim 19, wherein the maximum distance is about 0.5 times the diameter of the injection bore.

21. An internal combustion engine according to claim 13, wherein the flow-directing surface has a concave shape, its largest curvature being in an exit area of the flow and in the area of the nozzle of the injection device.

22. An internal combustion engine according to claim 13, wherein the flow-directing surface has a concave shape, its largest curvature being in an exit area of the flow or in the area of the nozzle of the injection device.

23. An internal combustion engine according to claim 13, wherein the flow-directing surface has an asymmetrical shape in a sectional veiw normal to a cylinder axis.

24. An internal combustion engine according to claim 13, wherein the flow-directing surface has a symmetrical shape in a sectional view normal to the cylinder axis.

\* \* \* \* \*